United States Patent
Norman, Sr.

[15] 3,676,753
[45] July 11, 1972

[54] ELECTRICAL CAPACITOR ASSEMBLY WITH REPLACEABLE UNITS

[72] Inventor: Rayford M. Norman, Sr., 2117 Windover Drive, N.E., Huntsville, Ala. 35811

[22] Filed: June 3, 1971

[21] Appl. No.: 149,653

[52] U.S. Cl. ............................................. 317/230, 317/242
[51] Int. Cl. .......................................................... H01g 9/08
[58] Field of Search ........................... 317/230, 231, 233, 242

[56] References Cited

UNITED STATES PATENTS

| | | | |
|---|---|---|---|
| 2,488,763 | 11/1949 | Charlin | 317/230 |
| 2,897,418 | 7/1959 | Call | 317/230 |
| 3,159,776 | 12/1964 | Metcalf | 317/230 |
| 3,275,902 | 9/1966 | McHugh et al. | 317/230 |
| 3,346,783 | 10/1967 | Millard | 317/230 |
| 3,581,158 | 5/1971 | Shirek | 317/230 |

*Primary Examiner*—James D. Kallam
*Attorney*—C. A. Phillips

[57] ABSTRACT

An electrical capacitor assembly consisting of a base having a plurality of like spaced pairs of electrical receptacles and a plurality of stacked cylindrical electrolytic capacitor elements, each element having a plurality of pairs of receptacle-like terminals passing through, end-to-end of the capacitor element and wherein one pair serves to electrically connect to the plates of the capacitor of that element and the other pairs serve as feed through conductors and receptacles for the other, like, stacked capacitor elements. In this fashion a composite capacitor assembly is made up of a desired selected combination of stacked capacitor elements interconnected by pin connectors coupling receptacles of adjacent capacitor elements.

9 Claims, 9 Drawing Figures

PATENTED JUL 11 1972
3,676,753
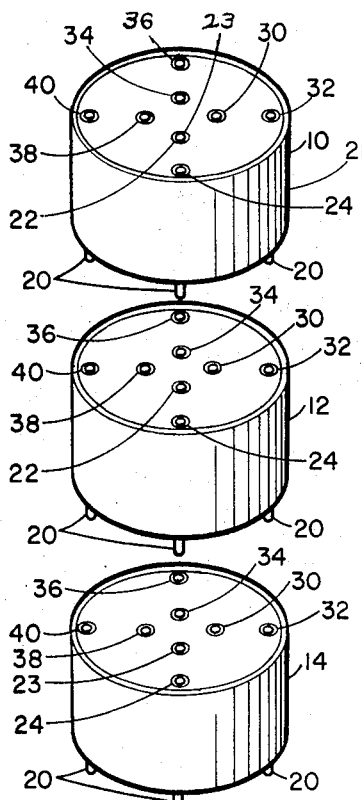
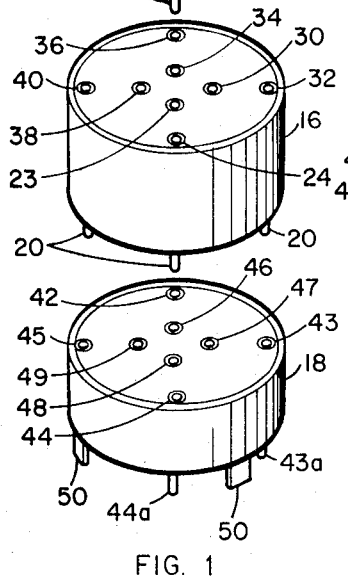
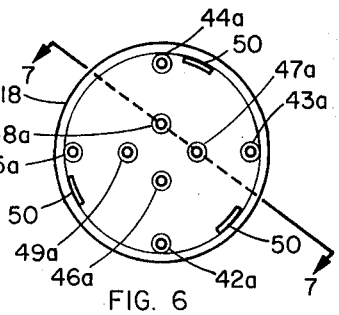
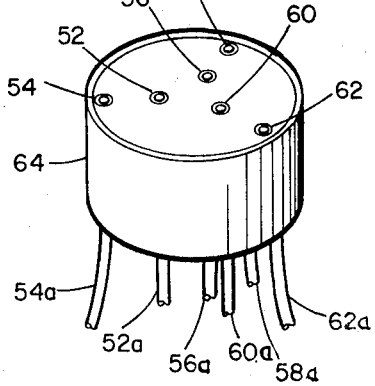
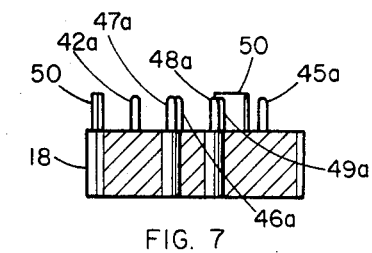
INVENTOR.
BY RAYFORD M. NORMAN SR.
C. A. Phillips

ELECTRICAL CAPACITOR ASSEMBLY WITH REPLACEABLE UNITS

This application is a continuation-in-part of patent application entitled Electrical Capacitor Assembly, Ser. No. 857,024 filed by the applicant on Sept. 11, 1969.

This invention relates to multi-unit or element electrical capacitor construction and still more particularly to electrolytic capacitor construction wherein multiple element capacitor assemblies can be readily constructed by joining together prefabricated single capacitor elements.

Electrical and electronic devices typically employ many electrical capacitors and of these, many are of the multiple element electrolytic type, wherein several, typically two to four, capacitor units are combined in a single housing and wherein one terminal of each, the negative terminal, is connected to a common or ground terminal, e.g., a metal housing, a supporting tab or other accessible terminal or lead.

As an illustration, one capacitor unit might be 350 MFD at a working voltage of 450 volts, another might be 250 MFD at 500 volts, another of 50 MFD at 100 volts and another at 20 MFD at 50 volts. There are literally thousands, possibly tens of thousands, of such combinations of capacitor values and voltages required in existing electrical and electronic circuitry and for which it is now necessary to manufacture individual multi-capacity-voltage rating units to meet these requirements, both for original equipment and for replacement purposes. This, of course, also requires that distributors, dealers and repair service shops stock or attempt to stock many, many capacitors for which actual requirements are uncertain in order to be equipped to handle potential customer demands. As a result, tremendous inventories are maintained by manufacturers and the larger distributors in order to provide complete selections even though calls for many types are infrequent. This is, of course, an uneconomical situation and one which increases capacitor costs in general. Smaller distributors simply cannot afford to maintain complete stocks and are thus put to a disadvantage as unable to effectively compete. Further, since the majority of distributors fall in the latter class, it means that their customers are often unable to obtain a needed capacitor.

Another aspect of the situation is that in most instances when there is a failure of a multi-unit capacitor only one of the units actually fails and thus it becomes necessary to discard several working capacitor elements in order to replace the single bad one.

Other than as disclosed in applicant's copending application, referred to above, and with respect to which the present application represents certain improvements, the applicant is unaware of the existence of any actual capacitor assemblies or literature illustrative of same which meet the existing need for a multi-element capacitor assembly of components which can be economically manufactured, where selected capacitor units may be readily combined with other selected capacitor units and the composite assembly be both structurally durable and electrically reliable.

It is, accordingly, an object of this invention to provide a new capacitor assembly wherein any desired combination of several capacity values and working voltages my be duplicated in a single mounted structure conveniently and economically with a relatively small stock of base units and single unit capacitor elements.

In accordance with the invention, individual capacitor elements, typically consisting of two sheets of thin metal foil separated by a thin sheet or layer of dielectric material, are wound in a conventional manner but in the form of short-cylindrical capacitor units with values of capacitance and voltage ratings dependent upon the total area of the metal foil, the characteristics of the dielectric material, voltage breakdown of the dielectric material and thickness of the dielectrical material. Uniquely in this case, a capacitor unit has a plurality of pairs of feed-through terminals extending through the units from end to end, one pair of which connect internally to the spaced capacitor plates. The other pairs serve as electrical busses and as structural support for interconnecting other like capacitor units to its supporting base. Two to four units are typically stacked in this fashion. A supporting base is employed which has sufficient number of pairs of mating terminals to accommodate the number of capacitors to be stacked, typically three or four pairs of terminals. To connect to the bottom stacked capacitor the terminals of the base are adapted to mate with the capacitor terminals and at the opposite end of the base there is provided connecting terminals adapted to connect to the circuit in which the capacitors are to be used. By the capacitor configuration of this invention either parallel or series interconnection of capacitor units may be readily accomplished and thus with only a few different valued capacitor units it is possible to provide an extremely large number of different capacitor combinations. Typically conductive pins interconnect the terminals of adjacent capacitor units and between the bottom unit and the base.

These and other objects, features and advantages of this invention will become more apparent from the following description when considered together with the drawings in which:

FIG. 1 is an exploded perspective view of a capacitor assembly constructed in accordance with the invention;

FIG. 2 is a perspective view from the lower end of one of the capacitor elements shown in FIG. 1;

FIG. 3 is a perspective view from the upper end of one capacitor unit shown in FIG. 1;

FIG. 4 is an end view of one of the capacitor units shown in FIG. 1;

FIG. 5 is a sectional view along the lines 5—5 of FIG. 4;

FIG. 6 is a bottom view of a base member shown in FIG. 1.

FIG. 7 is a sectional view along the lines 7—7 of FIG. 6;

FIG. 8 is a perspective view of a pin coupler for interconnecting capacitor units; and FIG. 9 is a perspective view of a base unit adapted to support and interconnect three stacked capacitor units and in which terminals are in the form of terminal leads.

Referring now to the drawings, particularly to FIGS. 1–8, individual capacitor units 10, 12, 14 and 16 of selected capacitive values and voltage ratings are illustrated together with chassis mounting base 18 and coupling pins 20. Capacitor unit 16, for example, is shown in FIGS. 2–5 and it is a short cylindrical capacitor constructed in an insulated housing 21 with eight electrical receptacles 22. Electrical receptacles 22 are tubular and extend from end to end and, as shown in FIG. 5, only two of the receptacles, receptacles 23 and 24, are connected to capacitor plates 26 and 28 of that particular capacitor unit. The rest of the receptacle pairs, comprising receptacles 30 and 32, 34 and 36, 38 and 40, function as feed-through conductors for like constructed capacitor units 10, 12 and 14. The spacing between the inner receptacles 23, 30, 34 and 38 is exaggerated for purposes of illustration. In practice spacing would be much closer to conserve winding space in a capacitor unit.

The capacitor units are electrically and mechanically interconnected by coupling pins 20 (FIG. 8) with individual capacitor units being oriented with respect to base 18 to provide desired connections to base receptacles 42–49. It will be appreciated that if it is desired to connect particular capacitor units in parallel that they would be oriented with their active receptacles interconnected. Where it is desired to connect a capacitor terminal to a chassis ground, this is done by interconnection of an appropriate terminal of terminals 42a–49a to a tab or lug 50 which is typically soldered to a chassis. Outer terminals 42a–45a (on the bottom of base 18) are connected to correspondingly positioned and numbered receptacles (on the top side of base 18) and typically serve as negative terminals. Inner terminals 46a–49a are interconnected and typically serve as positive terminals. Receptacles and terminals are paired along generally radial lines and thus receptacle pairs 42 and 46, 43 and 47, 44 and 48 and 45 and 49 each connect to the plate connections of a particular capacitor unit, plugged through to that pair of receptacles. Tabs or lugs 50 secure base 18 to the chassis of electrical circuits to which capacitor units are to be connected and provide a convenient connection point for connecting any of the capacitor terminals to the chassis which frequently serves as an electrical common or ground conductor.

FIG. 9 illustrates a variation of the invention in which instead of a base 18 having a plurality of pins or lug type terminals 42a–49a for connecting to other circuit elements, wire leads 52a, 54a, 58a, 60a and 62a are provided and these connect to like numbered receptacles on the top of base 64. In addition, FIG. 9 illustrates an embodiment of the invention wherein there are only three pairs of receptacles and leads and thus base 64 is adapted to receive three capacitor units rather than four. Of course, three or four sets of receptacles or terminals may be employed with this configuration as well as the one shown in FIGS. 1–8. Typically a base adapted for receiving three capacitor units would be smaller in construction than one adapted for four capacitor units. For example, a four unit base would typically be 1⅜inches in diameter and three unit base would typically be 1 inch in diameter.

The present invention has application both to existing electrical and electronic circuit devices and in the construction of new ones. For example in the case of repair to an existing circuit device wherein there occurred a capacitor failure, a base 18, or 64, would be installed in place of a failing multiple capacitor unit and selected capacitor units would be plugged in to provide the desired individual capacitance. In the base of new construction a base 18 or 64 would be initially interconnected in a circuit and the desired capacitor units plugged in. Thereafter, any failure of a unit would require only the replacement of the failing unit and not the whole capacitor assembly. Thus the invention enables a saving for all concerned; to the manufacturer of capacitors, to the distributor, serviceman and equipment manufacturer who may thereby maintain smaller inventories of capacitors. Perhaps most important the ultimate consumer will save by virtue of the savings of those from whom he purchases new equipment or replacement parts.

What is claimed is:

1. An electrical capacitor assembly comprising:
   A. a plurality of end-to-end stacked capacitor units disconnectably connected into an assembly wherein each unit comprises:
      1. a capacitor having first and second conductive plates separated by an insulating layer,
      2. a cylindrical insulated case surrounding said capacitor, and
      3. a plurality of pairs of spaced electrical terminals extending between end outer surfaces of said capacitor unit, one pair of said spaced terminals being electrically connected to said conductive plates of said capacitor unit, and each remaining pair of said spaced electrical terminals providing a coupling buss through said capacitor unit for other like capacitor units;
   B. a plurality of electrical couplers, each said coupler interconnecting adjacent terminals of said stacked capacitor units; and
   C. a mounting base assembly comprising:
      1. a base portion of insulating material,
      2. a plurality of spaced input terminals on said base portion positioned and connected respectively to said spaced electrical terminals of the adjacent one of said capacitor units, and
      3. a plurality of base output terminals on said base portion, said output terminals being connected respectively to said input terminal and comprising means for connecting said mounting base assembly to external circuitry.

2. A capacitor assembly as set forth in claim 1 wherein said electrical terminals extending between end surfaces of a said capacitor unit comprise receptacles adjacent each said end surface and said electrical couplers comprise conductive pins received in said receptacles and provide electrical contact between adjacently stacked of said capacitor units.

3. A capacitor assembly as set forth in claim 2 wherein said mounting base assembly further comprises bendable members for supporting said capacitor assembly to a supporting chassis.

4. A capacitor assembly as set forth in claim 2 wherein said output terminals comprise flexible wire.

5. A capacitor assembly as set forth in claim 2 comprising at least two of said capacitor units.

6. An electrical capacitor comprising:
   A. a cylindrically wound electrical capacitor having first and second plates separated by an insulating sheet;
   B. a cylindrical insulated case surrounding said capacitor; and
   C. a plurality of pairs of spaced electrical terminals extending between end surfaces of said capacitor, one pair of said spaced terminals being electrically connected respectively to said conductive plates of said capacitor and each of the remaining pairs of said spaced electrical terminals providing a coupling bus through said capacitor;
   whereby said capacitor may be disconnectably connected at either end to a like configured and electrically terminated capacitor or mounting base.

7. An electrical capacitor as set forth in claim 6 wherein said electrical terminals extending between end surfaces thereof comprise receptacles adjacent each end surface.

8. An electrical capacitor as set forth in claim 7 wherein each said receptacle comprises a tube extending from end to end of said capacitor.

9. An electrical capacitor as set forth in claim 6 wherein said insulating sheet holds an electrolyte for contact with said first and second plates.

* * * * *